United States Patent
Taveira et al.

(10) Patent No.: US 10,725,483 B2
(45) Date of Patent: Jul. 28, 2020

(54) PERSONAL SECURITY ROBOTIC VEHICLE

(71) Applicant: QUALCOMM Incorporated, San Diego, CA (US)

(72) Inventors: Michael Franco Taveira, San Diego, CA (US); Govindarajan Krishnamurthi, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 15/693,751

(22) Filed: Sep. 1, 2017

(65) Prior Publication Data

US 2019/0072985 A1  Mar. 7, 2019

(51) Int. Cl.
*G05D 1/12* (2006.01)
*G08G 5/00* (2006.01)
(Continued)

(52) U.S. Cl.
CPC .............. *G05D 1/12* (2013.01); *B64C 39/024* (2013.01); *G06K 9/0063* (2013.01);
(Continued)

(58) Field of Classification Search
CPC ........ G05D 1/12; G08G 5/045; G08G 5/0078; G08G 5/0069; G08G 5/0056; G08G 5/0021; G08G 5/0013; G08G 1/164; G08B 25/016; G08B 25/014; G08B 13/19613; G08B 25/10; G06K 9/00335; G06K 9/00362; G06K 9/0063; G06K 9/00771; G06K 2209/21; B64C 2201/127; B64C 2201/145; B64C 39/024; B64C 2201/12; B64D 47/02; B64D 47/08
See application file for complete search history.

(56) References Cited

U.S. PATENT DOCUMENTS 6,608,559 B1  8/2003 Lemelson et al.
9,589,448 B1 *  3/2017 Schneider ............ G08B 25/016
(Continued)

FOREIGN PATENT DOCUMENTS

FR        2986647 A3      8/2013
WO     2017065347 A1      4/2017
WO  WO-2018157325 A1 *   9/2018

OTHER PUBLICATIONS

Machine Translation of WO-2018157325-A1 (Year: 2017).*
International Search Report and Written Opinion—PCT/US2018/044483—ISA/EPO—dated Nov. 13, 2018, 15 pages.

*Primary Examiner* — Alan D Hutchinson
(74) *Attorney, Agent, or Firm* — Holland & Hart LLP

(57) ABSTRACT

Various methods for monitoring a target user by a drone include tracking the target user by the drone, detecting an object in the presence of the target user based on one or more detection criteria, determining whether the object is a potential threat to the target user based on one or more threat criteria, determining whether to notify the third party of the potential threat to the target user based on one or more notification criteria in response to determining that the object is a potential threat, notifying the third party of the potential threat to the target user in response to determining that the third party should be notified, receiving a response from the third party including a command, and performing an action based on the command.

30 Claims, 9 Drawing Sheets

(51) Int. Cl.
*G08B 13/196* (2006.01)
*G08G 5/04* (2006.01)
*G08B 25/01* (2006.01)
*G08G 1/16* (2006.01)
*B64C 39/02* (2006.01)
*G06K 9/00* (2006.01)
*G08B 25/10* (2006.01)
*B64D 47/02* (2006.01)
*B64D 47/08* (2006.01)

(52) U.S. Cl.
CPC ..... *G06K 9/00335* (2013.01); *G06K 9/00362* (2013.01); *G06K 9/00771* (2013.01); *G08B 13/19613* (2013.01); *G08B 25/014* (2013.01); *G08B 25/016* (2013.01); *G08B 25/10* (2013.01); *G08G 1/164* (2013.01); *G08G 5/0013* (2013.01); *G08G 5/0021* (2013.01); *G08G 5/0056* (2013.01); *G08G 5/0069* (2013.01); *G08G 5/0078* (2013.01); *G08G 5/045* (2013.01); *B64C 2201/12* (2013.01); *B64C 2201/127* (2013.01); *B64C 2201/145* (2013.01); *B64D 47/02* (2013.01); *B64D 47/08* (2013.01); *G06K 2209/21* (2013.01)

(56) References Cited

U.S. PATENT DOCUMENTS

| | | |
|---|---|---|
| 2011/0046920 A1 | 2/2011 | Amis |
| 2015/0134143 A1 | 5/2015 | Willenborg et al. |
| 2015/0353206 A1 | 12/2015 | Wang et al. |
| 2016/0042637 A1* | 2/2016 | Cahill ............... G08B 25/10 701/3 |
| 2016/0101856 A1 | 4/2016 | Kohstall |
| 2017/0092109 A1 | 3/2017 | Trundle et al. |
| 2018/0322749 A1* | 11/2018 | Kempel ......... G08B 13/19608 |

\* cited by examiner

US 10,725,483 B2

PERSONAL SECURITY ROBOTIC VEHICLE

BACKGROUND

A number of robotic vehicles, commonly referred to as drones, can be configured to follow users for a variety of purposes, such as recording images or video of the user as they move. Such drones may track a device carried by a user or track the user using a camera and image recognition processes.

SUMMARY

Various embodiments include methods for monitoring a target user by a drone. Various embodiments may include tracking the target user by the drone, detecting, by the drone, an object in the presence of the target user based on one or more detection criteria, determining, by the drone based on one or more threat criteria, whether the object is a potential threat to the target user, determining, by the drone, whether to notify the third party of the potential threat to the target user based on one or more notification criteria in response to determining that the object is a potential threat, notifying the third party of the potential threat to the target user in response to determining that the third party should be notified, receiving a response from the third party including a command, and performing, by the drone, an action based on the command.

Some embodiments may further include capturing audio-visual content by the drone of the detected object. In some embodiments, the one or more notification criteria may include at least one of: a location of the target user; a location of the third party; a time of day; a day of week; a nature of the potential threat; or existence of a geo-fence. In some embodiments, determining whether to notify the third party of the potential threat to the target user based on one or more notification criteria may include sending a notification message to a device associated with the third party in response to determining that each of the one or more notification criteria is met. In some embodiments, the notification message may include at least a portion of the captured audiovisual content. Some embodiments may further include identifying the one or more notification criteria based on input provided by the third party.

In some embodiments, the one or more detection criteria may include at least one of: a distance between the object and the target user; a length of time; a number of other objects; a location of the target user; or a location of the third party. In some embodiments, detecting the object in the presence of the target user may include determining whether each of the one or more detection criteria exceeds a corresponding detection threshold. Some embodiments may further include identifying the one or more detection criteria based on input provided by the third party and establishing each corresponding detection threshold based on input provided by the third party. Some embodiments may further include identifying, by the drone, the one or more detection criteria dynamically and establishing, by the drone, each corresponding detection threshold dynamically.

In some embodiments, the one or more threat criteria may include at least one of: existence of physical contact between the object and the target user; a type of the object; an orientation of the object; an identity of the object; a change in distance between the object and the target user; or recognition of a key word spoken within captured audio. In some embodiments, determining whether the object is a potential threat to the target user may include determining whether each of the one or more threat criteria matches a corresponding predetermined threat value or exceeds a corresponding threat threshold. Some embodiments may further include identifying the one or more threat criteria based on input provided by the third party and establishing each corresponding predetermined threat value or threat threshold based on input provided by the third party. Some embodiments may further include identifying, by the drone, the one or more detection criteria dynamically and establishing, by the drone, each corresponding predetermined threat value or threat threshold dynamically.

In some embodiments, performing the action may include performing one or more of: recording an image or video of the object and the target user; emitting an alarm; emitting a light; navigating the drone to a position between the object and the target user; moving the drone towards the object; emitting an audio message; or establishing a channel of communication with emergency personnel and/or the third party.

Further embodiments include a drone including a processor configured with processor-executable instructions to perform operations of the methods summarized above. Further embodiments include a non-transitory processor-readable storage medium having stored thereon processor-executable software instructions configured to cause a processor of a drone to perform operations of the methods summarized above. Further embodiments include a drone that includes means for performing functions of the methods summarized above.

BRIEF DESCRIPTION OF THE DRAWINGS

The accompanying drawings, which are incorporated herein and constitute part of this specification, illustrate exemplary embodiments of the claims, and together with the general description and the detailed description given herein, serve to explain the features of the claims.

DETAILED DESCRIPTION

Figure 1:
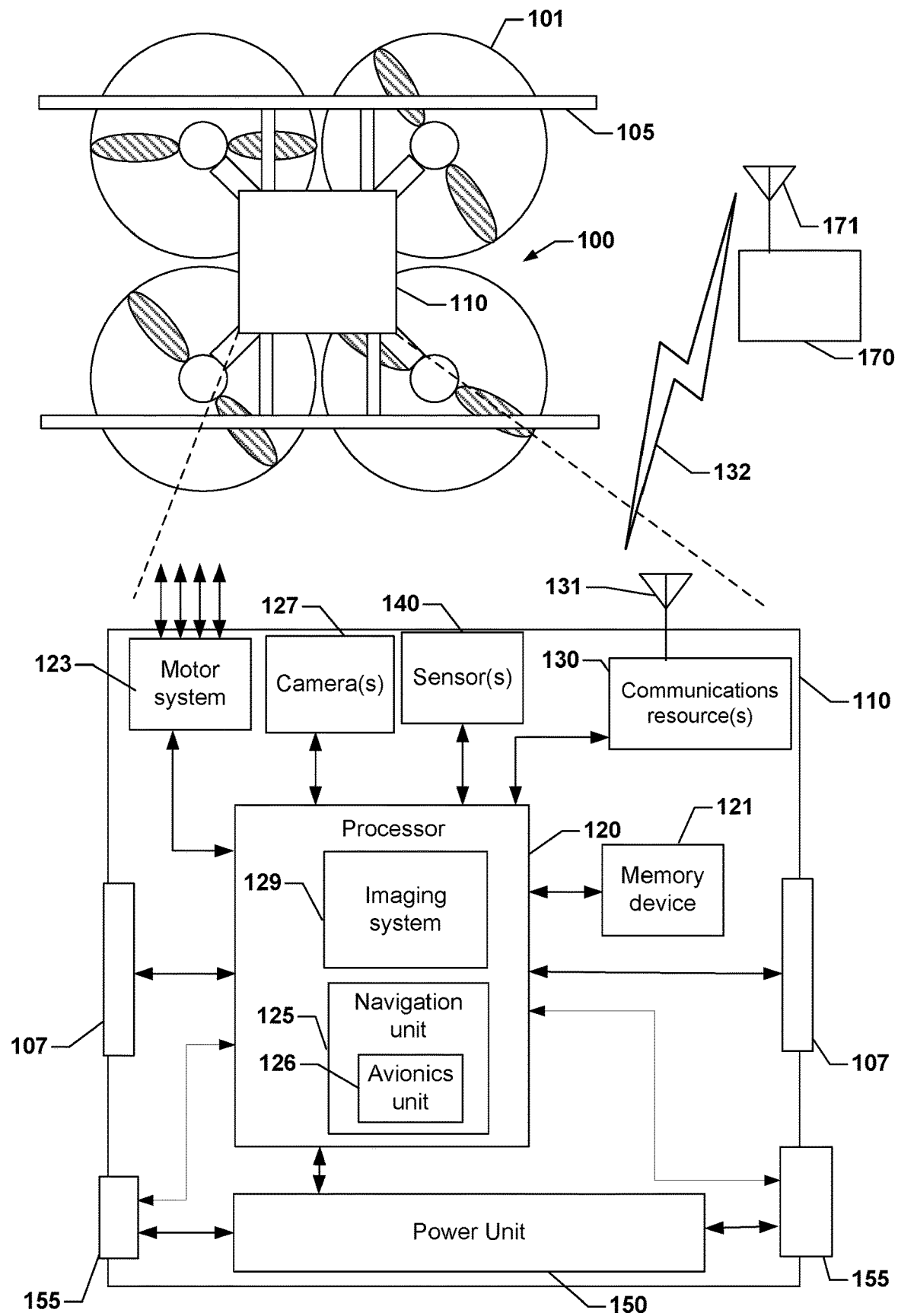
FIG. 1 is a block diagram illustrating components of a robotic vehicle, such as an aerial unmanned autonomous vehicle (UAV), suitable for use in various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Robotic vehicles, such as drones and autonomous motor vehicles, can be used for tracking a target entity. For ease of reference, the term "target entity" is used to refer to a person, animal, or object that a robotic vehicle has been tasked to follow and monitor surroundings to detect potential threats. Also for ease of reference, an individual or individuals interested in, concerned about, or otherwise responsible for a target entity is referred to as a "third party." However, these terms are not intended to be limiting and the term "third party" encompasses any person, group, or organization having pre-established interest in the well-being of the target entity (i.e., a pre-existing or predetermined relationship with the target entity). A robotic vehicle may carry a payload configured to perform a specific function, such as personal photography and videography. In addition, robotic vehicles may be configured to track and follow a target entity or a device carried by a target entity (e.g., a "follow-me" mode). However, robotic vehicles have not been applied to personal security by notifying a third party (e.g., a parent or parents) with a pre-established interest in the well-being of the target entity (e.g., a child of the parent). In particular, robotic vehicles have not been configured to intelligently determine when to (and when not to) notify an interested third party regarding threats to a target entity.

Various embodiments include methods for tracking a target entity by a robotic vehicle, detecting an object in the presence of the target entity based on one or more detection criteria, and determining whether the object is a potential threat to the target entity. In response to determining the object is a potential threat, the robotic vehicle may determine whether to notify a third party of the potential threat to the target entity based on one or more notification criteria. In response to determining the third party should be notified, the robotic vehicle may notify the third party. This notification may include one or more images, video, and/or audio captured by the robotic vehicle and the received response may include a command. The robotic vehicle may receive a response from the third party and perform an action based on a command included in the received response. Various embodiments thus enable a robotic vehicle to intelligently identify potential threats to a target entity and selectively notify a third party appropriately. This may allow the third party to efficiently and effectively monitor the target entity, for example, by reducing false-positive threat notifications or preventing desensitization of the third party from too many threat notifications.

As used herein, the term "robotic vehicle" refers to one of various types of vehicles including an onboard computing device configured to provide some autonomous or semi-autonomous capabilities. Examples of robotic vehicles include but are not limited to: aerial vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

In various embodiments, a robotic vehicle may track a target entity and may detect an object in the presence of the target entity based on one or more detection criteria. The robotic vehicle may use any of a number of sensors or mechanisms for detecting the object.

In some embodiments, the one or more detection criteria may include (but are not limited to) a distance (e.g., a distance threshold) between the object and the target entity, a length of time, a number of other objects, a location of the target entity, a location of a third party, and/or the like. Some embodiments may include identifying the one or more detection criteria based on input provided by the third party and establishing corresponding detection threshold(s) based on the provided input. Some embodiments may include identifying the one or more detection criteria dynamically by the robotic vehicle and establishing corresponding detection threshold(s) dynamically by the robotic vehicle. In some embodiments, the robotic vehicle may utilize historical data or other information to dynamically identify the one or more detection criteria and dynamically establish corresponding detection threshold(s).

A robotic vehicle may be configured to track and follow a target entity (or a device carried by the target entity), in what is known as a "follow-me" mode. For example, a robotic vehicle may be configured to follow behind or ahead of (or above) a target entity and track the target entity, for example, by photographing or taking video of the target entity (e.g., fly ahead or behind a target entity skiing while recording video of the target entity). In some embodiments, the robotic vehicle may implement any suitable mechanism for tracking the target entity directly (e.g., visually tracking the target entity) and/or indirectly (e.g., visually tracking a device carried by the entity or tracking some signal or other observable signal or parameter from a device carried by the entity).

In various embodiments, the robotic vehicle may be configured to fly ahead of the target entity monitoring the area ahead of and around the target entity rather than or in addition to photographing the target entity. The robotic vehicle may be configured to monitor areas surrounding and/or ahead of the target entity for objects posing a potential threat and, based on selected criteria, notify a third party of the potential threat. The robotic vehicle may be further configured to perform an action based on a command received from the third party in response to the notification. Such robotic vehicles may have applications in providing customizable personal security for the target entity on behalf of the third party, such as tracking a child on behalf of a parent or tracking a pet on behalf of the pet's owner. However, in various embodiments, the robotic vehicle may be configured to position itself at any suitable location relative to the target entity including, but not limited to, behind, above, and/or to the side of the entity.

In some embodiments, the robotic vehicle may use an onboard camera to capture one or more images or video of an area around the target entity. In some embodiments, the robotic vehicle may use an onboard microphone to capture audio from an area around the target entity. In some embodiments, the robotic vehicle may use any suitable sensor(s) for capturing data regarding an area around the target entity.

In some embodiments, the robotic vehicle may determine whether the object is a potential threat to the target entity based on one or more threat criteria. In some embodiments, the one or more threat criteria may include (but is not limited to), a distance between the object and the target entity, actual or potential physical contact between the object and the target entity, the type of object, the size of the object, the speed of the object, an orientation of the object (e.g., whether facing the target entity), an identity of the object, a change in distance between the object and the target entity, a rate of change in distance, a gesture performed by the object or the target entity, a key word or sound spoken (by the object or the target entity) within captured audio, and/or the like. In various embodiments, the one or more threat criteria may be identified based on an input from the interested third party (or other party) or may be identified dynamically by the robotic vehicle. In various embodiments, corresponding threat threshold(s) may be established based on inputs from the interested third party (or other party) or may be established dynamically by the robotic vehicle.

If the object is determined to be a potential threat, the robotic vehicle may determine whether to notify the interested third party of the potential threat to the target entity based on one or more notification criteria. In some embodiments, the one or more notification criteria may include (but are not limited to) a location of the target entity, a location of the third party, a distance between the target entity and the third party, a presence of one or more obstacles around the target entity and/or the third party (e.g., that might obstruct a view of the target entity by robotic vehicle), a time of day, a day of week, a nature of the potential threat, existence of a geo-fence, and/or the like. Some embodiments may include sending a notification to a device associated with the third party if the one or more notification criteria are met. In some embodiments, the notification may include (but is not limited to) the captured image(s), video, audio, and/or other sensor information from the area around the target entity.

In some embodiments, the robotic vehicle may receive a response, including a command, from the third party. Some embodiments may include the robotic vehicle performing one or more actions based on the command. In some embodiments, the action may include (but is not limited to) recording an image, video, or audio of the object and the target entity, emitting an alarm, emitting/flashing a light, navigating the drone to a position between the object and the target entity, moving the drone towards the object, emitting an audio or video message (e.g., a pre-recorded audio message, an audio message directly from the third party, etc.), establishing a channel of communication with emergency personnel and/or the third party, and/or the like.

The terms Global Positioning System (GPS) and Global Navigation Satellite System (GNSS) are used interchangeably herein to refer to any of a variety of satellite-aided navigation systems, such as GPS deployed by the United States, GLObal NAvigation Satellite System (GLONASS) used by the Russian military, and Galileo for civilian use in the European Union, as well as terrestrial communication systems that augment satellite-based navigation signals or provide independent navigation information.

FIG. 1 illustrates an example aerial robotic vehicle 100 suitable for use with various embodiments. The example robotic vehicle 100 is a "quad copter" having four horizontally configured rotary lift propellers, or rotors 101 and motors fixed to a frame 105. The frame 105 may support a control unit 110, landing skids and the propulsion motors, power source (power unit 150) (e.g., battery), payload securing mechanism (payload securing unit 107), and other components. Land-based and waterborne robotic vehicle may include components similar to those illustrated in FIG. 1.

The robotic vehicle 100 may be provided with a control unit 110. The control unit 110 may include a processor 120, communication resource(s) 130, sensor(s) 140, and a power unit 150. The processor 120 may be coupled to a memory unit 121 and a navigation unit 125. The processor 120 may be configured with processor-executable instructions to control flight and other operations of the robotic vehicle 100, including operations of various embodiments. In some embodiments, the processor 120 may be coupled to a payload securing unit 107 and landing unit 155. The processor 120 may be powered from the power unit 150, such as a battery. The processor 120 may be configured with processor-executable instructions to control the charging of the power unit 150, such as by executing a charging control algorithm using a charge control circuit. Alternatively or additionally, the power unit 150 may be configured to manage charging. The processor 120 may be coupled to a motor system 123 that is configured to manage the motors that drive the rotors 101. The motor system 123 may include one or more propeller drivers. Each of the propeller drivers includes a motor, a motor shaft, and a propeller.

Through control of the individual motors of the rotors 101, the robotic vehicle 100 may be controlled in flight. In the processor 120, a navigation unit 125 may collect data and determine the present position and orientation of the robotic vehicle 100, the appropriate course towards a destination, and/or the best way to perform a particular function.

An avionics component 126 of the navigation unit 125 may be configured to provide flight control-related information, such as altitude, attitude, airspeed, heading and similar information that may be used for navigation purposes. The avionics component 126 may also provide data regarding the orientation and accelerations of the robotic vehicle 100 that may be used in navigation calculations. In some embodiments, the information generated by the navigation unit 125, including the avionics component 126, depends on the capabilities and types of sensor(s) 140 on the robotic vehicle 100.

The control unit 110 may include at least one sensor 140 coupled to the processor 120, which can supply data to the navigation unit 125 and/or the avionics component 126. For example, the sensor(s) 140 may include inertial sensors, such as one or more accelerometers (providing motion sensing readings), one or more gyroscopes (providing rotation sensing readings), one or more magnetometers (providing direction sensing), or any combination thereof. The sensor(s) 140 may also include GPS receivers, barometers, thermometers, audio sensors, motion sensors, etc. Inertial sensors may provide navigational information, e.g., via dead reckoning, including at least one of the position, orientation, and velocity (e.g., direction and speed of movement) of the robotic vehicle 100. A barometer may provide ambient pressure readings used to approximate elevation level (e.g., absolute elevation level) of the robotic vehicle 100.

In some embodiments, the communication resource(s) 130 may include a GPS receiver, enabling GNSS signals to be provided to the navigation unit 125. A GPS or GNSS receiver may provide three-dimensional coordinate information to the robotic vehicle 100 by processing signals received from three or more GPS or GNSS satellites. GPS and GNSS receivers can provide the robotic vehicle 100 with an accurate position in terms of latitude, longitude, and altitude, and by monitoring changes in position over time, the navigation unit 125 can determine direction of travel and speed over the ground as well as a rate of change in altitude. In some embodiments, the navigation unit 125 may use an additional or alternate source of positioning signals other than GNSS or GPS. For example, the navigation unit 125 or one or more communication resource(s) 130 may include one or more radio receivers configured to receive navigation beacons or other signals from radio nodes, such as navigation beacons (e.g., very high frequency (VHF) omnidirectional range (VOR) beacons), Wi-Fi access points, cellular network sites, radio stations, etc. In some embodiments, the navigation unit 125 of the processor 120 may be configured to receive information suitable for determining position from the communication resources(s) 130.

In some embodiments, the robotic vehicle 100 may use an alternate source of positioning signals (i.e., other than GNSS, GPS, etc.). Because robotic vehicles often fly at low altitudes (e.g., below 400 feet), the robotic vehicle 100 may scan for local radio signals (e.g., Wi-Fi signals, Bluetooth signals, cellular signals, etc.) associated with transmitters (e.g., beacons, Wi-Fi access points, Bluetooth beacons, small cells (picocells, femtocells, etc.), etc.) having known locations such as beacons or other signal sources within restricted or unrestricted areas near the flight path. The navigation unit 125 may use location information associated with the source of the alternate signals together with additional information (e.g., dead reckoning in combination with last trusted GNSS/GPS location, dead reckoning in combination with a position of the robotic vehicle takeoff zone, etc.) for positioning and navigation in some applications. Thus, the robotic vehicle 100 may navigate using a combination of navigation techniques, including dead-reckoning, camera-based recognition of the land features below and around the robotic vehicle 100 (e.g., recognizing a road, landmarks, highway signage, etc.), etc. that may be used instead of or in combination with GNSS/GPS location determination and triangulation or trilateration based on known locations of detected wireless access points.

In some embodiments, the control unit 110 may include a camera 127 and an imaging system 129. The imaging system 129 may be implemented as part of the processor 120, or may be implemented as a separate processor, such as an application specific integrated circuit (ASIC), a field programmable gate array (FPGA), or other logical circuitry. For example, the imaging system 129 may be implemented as a set of executable instructions stored in the memory unit 121 that execute on the processor 120 coupled to the camera 127. The camera 127 may include sub-components other than image or video capturing sensors, including auto-focusing circuitry, International Organization for Standardization (ISO) adjustment circuitry, and shutter speed adjustment circuitry, etc.

The control unit 110 may include one or more communication resources 130, which may be coupled to at least one transmit/receive antenna 131 and include one or more transceivers. The transceiver(s) may include any of modulators, de-modulators, encoders, decoders, encryption modules, decryption modules, amplifiers, and filters. The communication resource(s) 130 may be capable of device-to-device and/or cellular communication with other robotic vehicles, wireless communication devices carried by a user (e.g., a smartphone), a robotic vehicle controller, and other devices or electronic systems (e.g., a vehicle electronic system).

The processor 120 and/or the navigation unit 125 may be configured to communicate through the communication resource(s) 130 with a wireless communication device 170 through a wireless connection (e.g., a cellular data network) to receive assistance data from the server and to provide robotic vehicle position information and/or other information to the server.

A bi-directional wireless communication link 132 may be established between transmit/receive antenna 131 of the communication resource(s) 130 and the transmit/receive antenna 171 of the wireless communication device 170. In some embodiments, the wireless communication device 170 and robotic vehicle 100 may communicate through an intermediate communication link, such as one or more wireless network nodes or other communication devices. For example, the wireless communication device 170 may be connected to the communication resource(s) 130 of the robotic vehicle 100 through a cellular network base station or cell tower. Additionally, the wireless communication device 170 may communicate with the communication resource(s) 130 of the robotic vehicle 100 through a local wireless access node (e.g., a Wi-Fi access point) or through a data connection established in a cellular network.

In some embodiments, the communication resource(s) 130 may be configured to switch between a cellular connection and a Wi-Fi connection depending on the position and altitude of the robotic vehicle 100. For example, while in flight at an altitude designated for robotic vehicle traffic, the communication resource(s) 130 may communicate with a cellular infrastructure in order to maintain communications with the wireless communication device 170. For example, the robotic vehicle 100 may be configured to fly at an altitude of about 400 feet or less above the ground, such as may be designated by a government authority (e.g., FAA) for robotic vehicle flight traffic. At this altitude, it may be difficult to establish communication links with the wireless communication device 170 using short-range radio communication links (e.g., Wi-Fi). Therefore, communications with the wireless communication device 170 may be established using cellular telephone networks while the robotic vehicle 100 is at flight altitude. Communications with the wireless communication device 170 may transition to a short-range communication link (e.g., Wi-Fi or Bluetooth) when the robotic vehicle 100 moves closer to a wireless access point.

While the various components of the control unit 110 are illustrated in FIG. 1 as separate components, some or all of the components (e.g., the processor 120, the motor system 123, the communication resource(s) 130, and other units) may be integrated together in a single device or unit, such as a system-on-chip. The robotic vehicle 100 and the control unit 110 may also include other components not illustrated in FIG. 1.

Figure 2A:
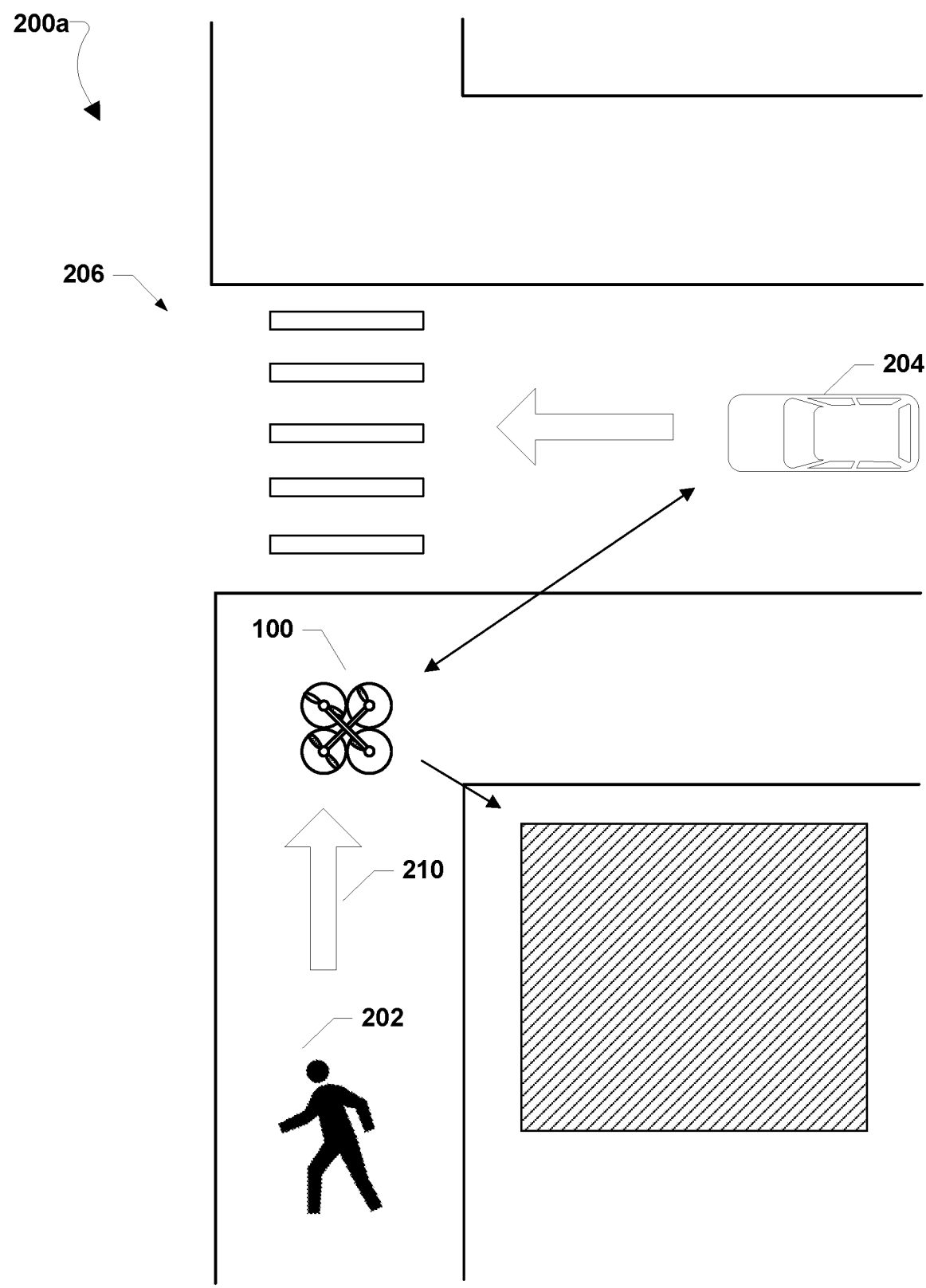
FIG. 2A is a diagram illustrating a robotic vehicle, such as a UAV, tracking a target entity according to various embodiments.
Figure 2B:
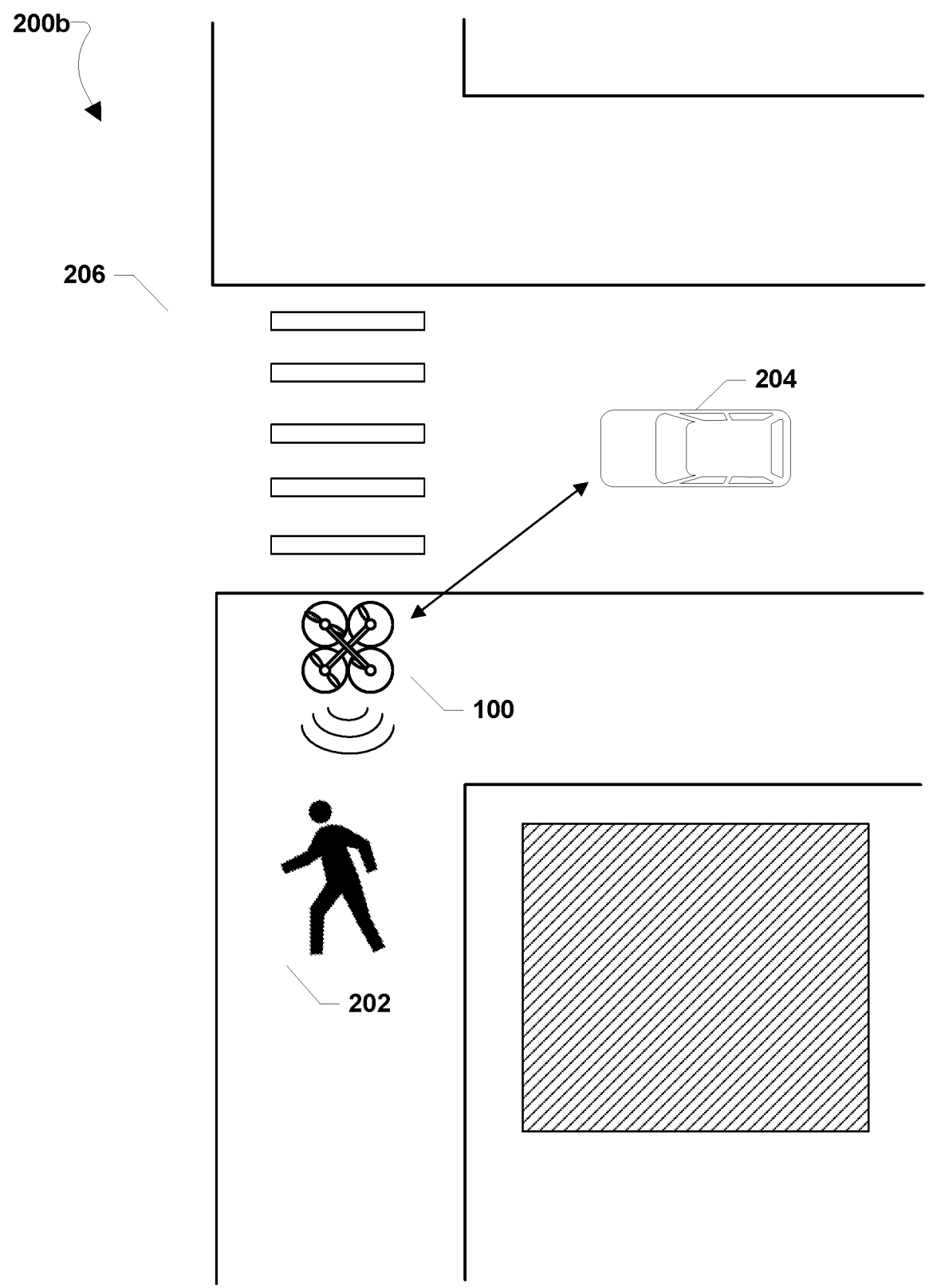
FIG. 2B is a diagram illustrating a robotic vehicle detecting an object in the presence of the target entity according to various embodiments.

FIGS. 2A-2B are diagrams illustrating a robotic vehicle monitoring an area surrounding a target entity for potential threats and intelligently providing notification to a third party according to various embodiments. With reference to FIGS. 1-2B, the diagram 200a includes a target entity 202, who may be a pedestrian, biker, jogger, or other person traveling in an open space such as a sidewalk, road, or the like. A third party (not depicted) may be in communication with a robotic vehicle, such as the robotic vehicle 100. For example, the third party may have a wireless communication device, such as a smart phone, smart watch, etc., that may be used to receive, based on a pre-established or predetermined interest or relationship, messages and/or warnings from the robotic vehicle 100. For example, a robotic vehicle may provide messages and/or warnings about a child to the child's parent(s). The target entity 202 may or may not be aware of the robotic vehicle 100.

The robotic vehicle 100 may be configured to track the target entity 202 and detect an object in the presence of the target entity 202, such as vehicle 204. Although the detected object is depicted as a vehicle in the diagrams 200a, 200b, this is only for simplicity as the detected object may be any item potentially posing a threat to the target entity (e.g., a person, an animal, a plant, a structure, etc.). Furthermore, although the target entity is depicted as a person in the diagrams 200a, 200b, this is only for simplicity as the target entity may alternatively be an animal, such as a pet, or an inanimate object, such as personal property, a vehicle, construction equipment, etc.

In some embodiments, the robotic vehicle 100 may utilize any suitable method(s) including any combination of (but not limited to) sensors, cameras, image processing, pattern recognitions, tracking algorithms, GPS, navigation systems, and other hardware and/or software components to detect the object in the presence of the target entity 202. For example, the robotic vehicle 100 may utilize a camera to capture images and video of the area around the target entity 202 and use image processing and tracking algorithms to detect stationary and moving objects (e.g., vehicles, humans, animals, bushes, trees, curbs, etc.).

In some embodiments, object detection may be based on one or more detection criteria. In some embodiments, identifying the one or more detection criteria may be based on input provided by the third party. Establishing corresponding detection threshold(s) may be based on input provided by the third party. In some embodiments, the robotic vehicle may dynamically identify the one or more detection criteria and may dynamically establish corresponding detection threshold(s). For example, a third party (e.g., a parent) may indicate proximity as one detection criteria and establish a detection threshold of 3 feet corresponding to proximity. Alternatively or in addition, the robotic vehicle may determine that the target entity is in a crowded environment (e.g., busy city sidewalk, shopping mall, sporting event or concert, etc.), identify proximity and length of time as detection criteria, and establish a detection threshold of 1.5 feet (or other value) corresponding to proximity and a detection threshold of two minutes (or other value) corresponding to length of time. Thus, according to some embodiments, different detection thresholds (e.g., proximity and/or time) may be selected based on environment, location, and/or the like.

For each detected object (e.g., each object that may come proximate to or intersect with the target entity 202 or an estimated travel path 210 of the target entity 202), the robotic vehicle 100 may determine whether or not the detected object does or could present a threat to the target entity 202. In order to assess the potential threat posed by each detected object, one or more threat criteria may be identified and a corresponding threat value or threat threshold may be established by a processor of the robotic vehicle. In some embodiments, identifying the one or more threat criteria and establishing corresponding threat value(s) or threat threshold(s) may be based on input provided by the third party. In other embodiments, the robotic vehicle processor may dynamically identify the one or more threat criteria and dynamically establish corresponding threat value(s) or threat threshold(s).

The threat criteria may include, but are not limited to, distance between the object and the target entity, existence of physical contact between the object and the target entity, a type of the object, a size of the object, a speed of the object, an orientation of the object, a change in distance between the object and the target entity, a rate of change in distance, a gesture performed by the object or the target entity, presence of a keyword or sound within captured audio, and/or the like. These threat criteria may be obtained using sensors, cameras, image processing, pattern recognitions, tracking algorithms, device-to-device and/or cellular communication, GPS, navigation systems, and other hardware and/or software components in the robotic vehicle 100. The threat criteria may have previously been obtained when detecting the approaching object and estimating its travel path. For example, the robotic vehicle 100 may communicate with the vehicle 204 using device-to-device and/or cellular communication to obtain position, velocity, size, and other attributes for the vehicle 204.

In some embodiments, the robotic vehicle 100 may compare the threat criteria of the detected object with a one or more threat thresholds and/or threat values. The robotic vehicle 100 may store a threat threshold or threat value for each threat criteria, such as an object type value, an object orientation value, and a change in separation distance. If the threat criteria of the detected object match a corresponding threat value or exceeds a corresponding threat threshold, the robotic vehicle 100 may determine that the detected object is a potential threat to the target entity 202. For example, the robotic vehicle 100 may store a physical contact value, and the detected object may be in physical contact with the target entity 202. Thus, the robotic vehicle 100 may determine that the detected object is a potential threat to the target entity 202. In another example, the robotic vehicle 100 may store a distance change threshold of 5 miles per hour (or other value). The threat values or threat thresholds may be expressed by reference to examples (e.g., animal, human, passenger vehicle, truck, etc.) or may be expressed in numerical form (e.g., 1 square meter). The robotic vehicle 100 may determine that the vehicle 204 is traveling at 10 miles per hour and therefore may be a potential threat to the target entity 202. In another example, the robotic vehicle 100 may determine that the intersection 206 satisfies a type threshold for intersection objects and may be a potential threat to the target entity 202, regardless of whether a vehicle will cross the intersection 206. The third party may configure each threat threshold according to preferences or the robotic vehicle may establish each threat threshold based on historical data and/or other information.

If the robotic vehicle 100 determines that a detected object is a potential threat to the target entity 202, the robotic vehicle 100 may send a notification to the third party based on one or more notification criteria. The notification criteria may include, but are not limited to, a location of the target entity, a location of the third party, a distance between the target entity and the third party, a presence of one or more obstacles around the target entity and the third party, a time of day, a day of week, a nature of the potential threat, existence of a geo-fence, and/or the like. For example, if the robotic vehicle 100 determines that the vehicle 204 is a potential threat to target entity 202, but the third party is accompanying the target entity 202, then the robotic vehicle 100 will not send a notification to the third party. In another example, if the robotic vehicle 100 determines that the vehicle 204 is a potential threat to the target entity 202 and the target entity 202 is outside a geo-fence (e.g., corresponding to a school zone), then the robotic vehicle 100 will send a notification to the third party. In some embodiments, identifying the one or more notification criteria may be based on input provided by the third party and establishing corresponding detection threshold(s) may be based on input provided by the third party. In other embodiments, the robotic vehicle may dynamically identify the one or more detection criteria and may dynamically establish corresponding detection threshold(s).

In some embodiments, the notification may include, but is not limited to, one or more images, video, audio, audiovisual content, and/or the like captured by the robotic vehicle 100. In some embodiments, the notification may be sent to a mobile device or other device associated with the third party. In this way, the third party may observe or otherwise be apprised of the potential threat posed to the target entity 202 so that the third party may make a more informed assessment of the potential threat to the target entity 202.

The robotic vehicle 100 may receive a response including a command from the third party, and the robotic vehicle 100 may perform one or more actions based on the command. In the example illustrated in the diagram 200b, both the target entity 202 and the vehicle 204 are approaching the intersection 206. Based on a command received from the third party, the robotic vehicle 100 may perform one or more actions to warn the target entity 202 or the vehicle 204, or otherwise prevent a collision. The actions may include, but are not limited to, recording an image, video, or audio of the object and the target entity, emitting an alarm, emitting/flashing a light, navigating the drone to a position between the object and the target entity, moving the drone towards the object, emitting an audio or video message, establishing a channel of communication with emergency personnel and/or the third party, and/or the like. For example, in the diagram 200b the robotic vehicle 100 may position itself in front of the intersection 206 to block the path of the target entity 202, display a visual warning to the target entity 202, and communicate with the vehicle 204 to indicate that the target entity 202 is approaching the intersection 206.

Figure 3:
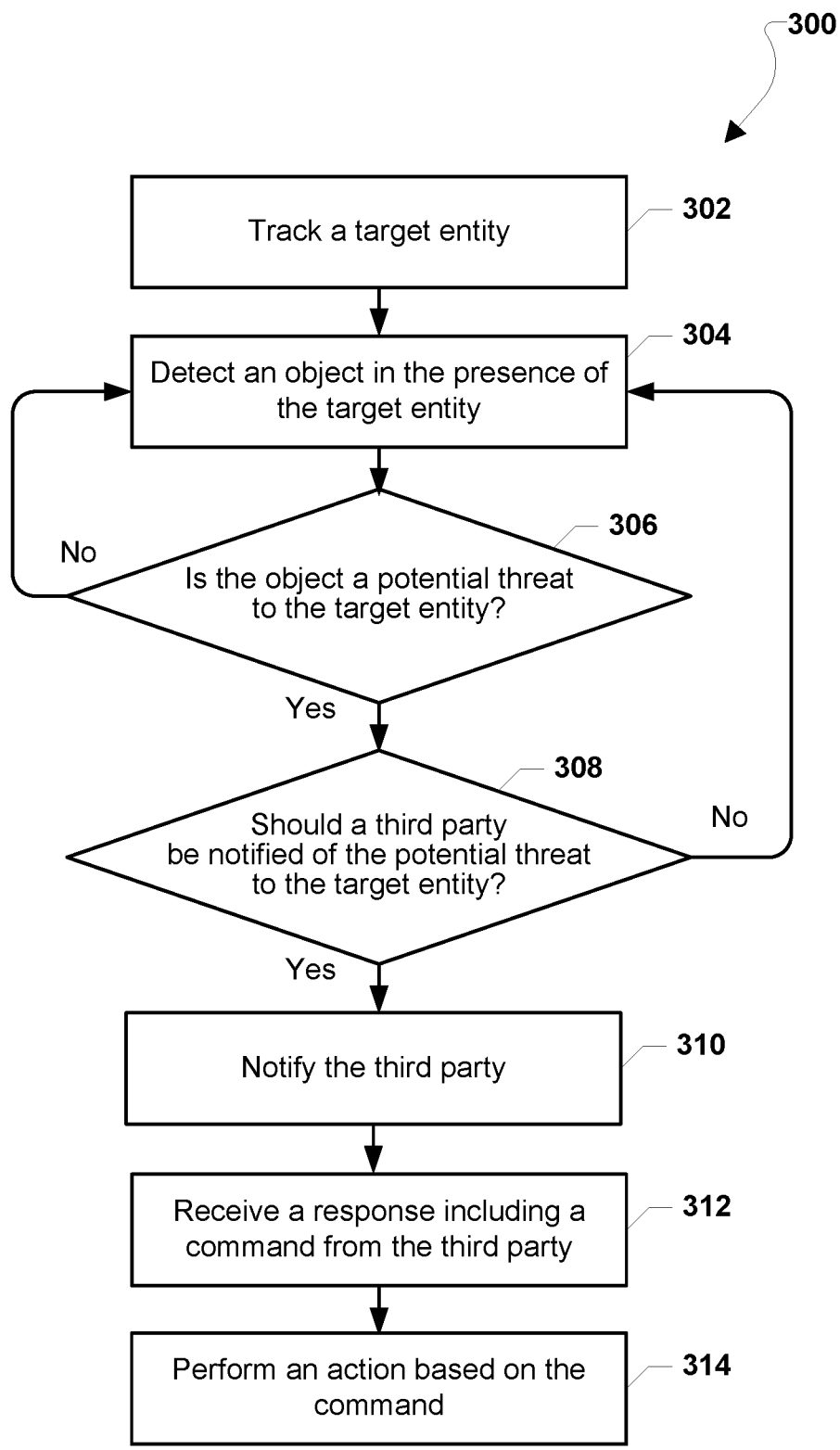
FIG. 3 is a process flow diagram illustrating a method for tracking a target entity according to various embodiments.

FIG. 3 illustrates a method 300 for utilizing at least one robotic vehicle to track a target entity according to various embodiments. With reference to FIGS. 1-3, the operations of the method 300 may be performed by a processor (e.g., the processor 120) of a robotic vehicle (e.g., robotic vehicle 100). The robotic vehicle may have sensors 140, cameras 127, and communication resources 130, and the processor 120 may be configured with image processing algorithms, pattern recognition, tracking algorithms, device-to-device and/or cellular communication, GPS, navigation systems, and other hardware and/or software components for detecting objects in the presence of a target entity and determining whether detected objects are a potential threat to the target entity.

In block 302, the processor of the robotic vehicle may control the robotic vehicle to track a target entity. For example, the robotic vehicle may determine a monitoring position that is a few meters higher than the user so that the robotic vehicle has line of sight to various nearby objects, and is several meters ahead of the user so that there is enough time to send a notification and perform one or more actions based on a response received from a third party.

Figure 4:
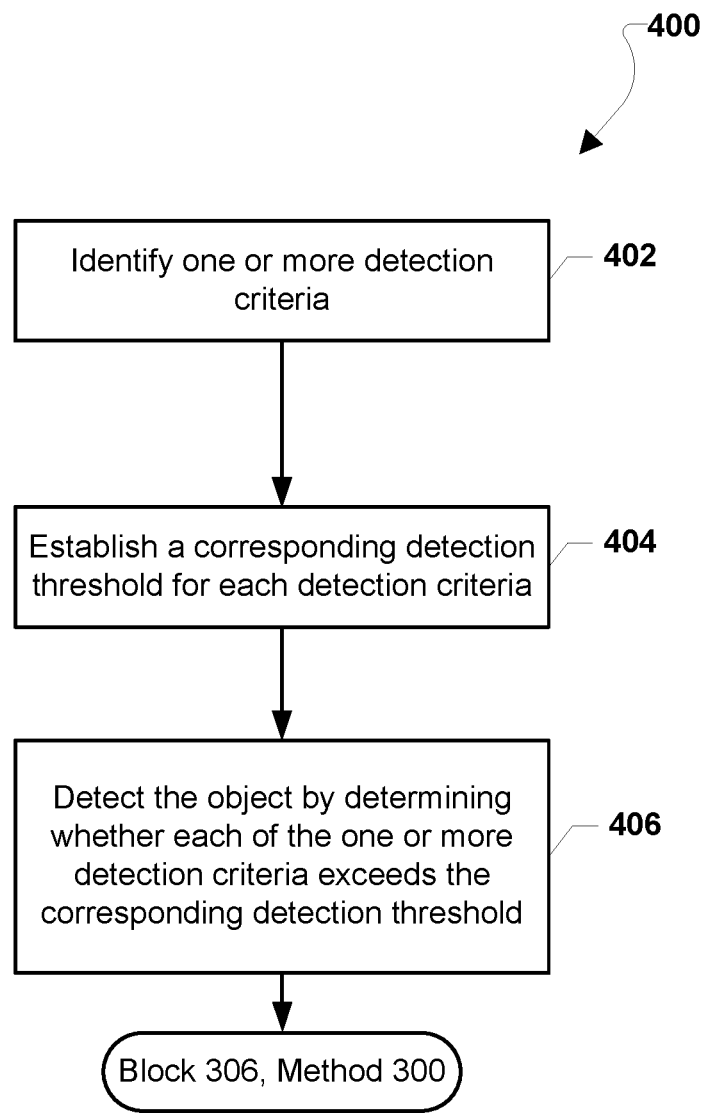
FIG. 4 is a process flow diagram illustrating a method for detecting an object in the presence of the target entity according to various embodiments.

In block 304, the processor may detect an object proximate or in the presence of the target entity. The processor may utilize sensors, cameras, image processing, pattern recognitions, tracking algorithms, device-to-device and/or cellular communication, GPS, navigation systems, and other hardware and/or software components to detect moving or stationary objects (e.g., other people, animals, vehicles, buildings, trees and plants, curbs, intersections, and other stationary or moving objects) in a determined area around the target entity. The determined area may depend on the position and velocity of the target entity, and/or may be specified by the third party. The determined area may also include a specified radius around the user, and/or an area surrounding the prior travel path of the user in order to scan for objects approaching from the sides or from behind the target entity. For example, the determined area to scan for objects may be between 0-100 meters (or other range) from all points of an estimated travel path and the prior travel path, as well as a radius 1 km from the current location of the target entity. The processor may estimate the travel path for each detected object and then determine whether the estimated travel path for any object will intersect with the estimated travel path of the target entity. Detecting an object in the presence of the target entity is described in more detail with reference to method 400 (FIG. 4).

Figure 5:
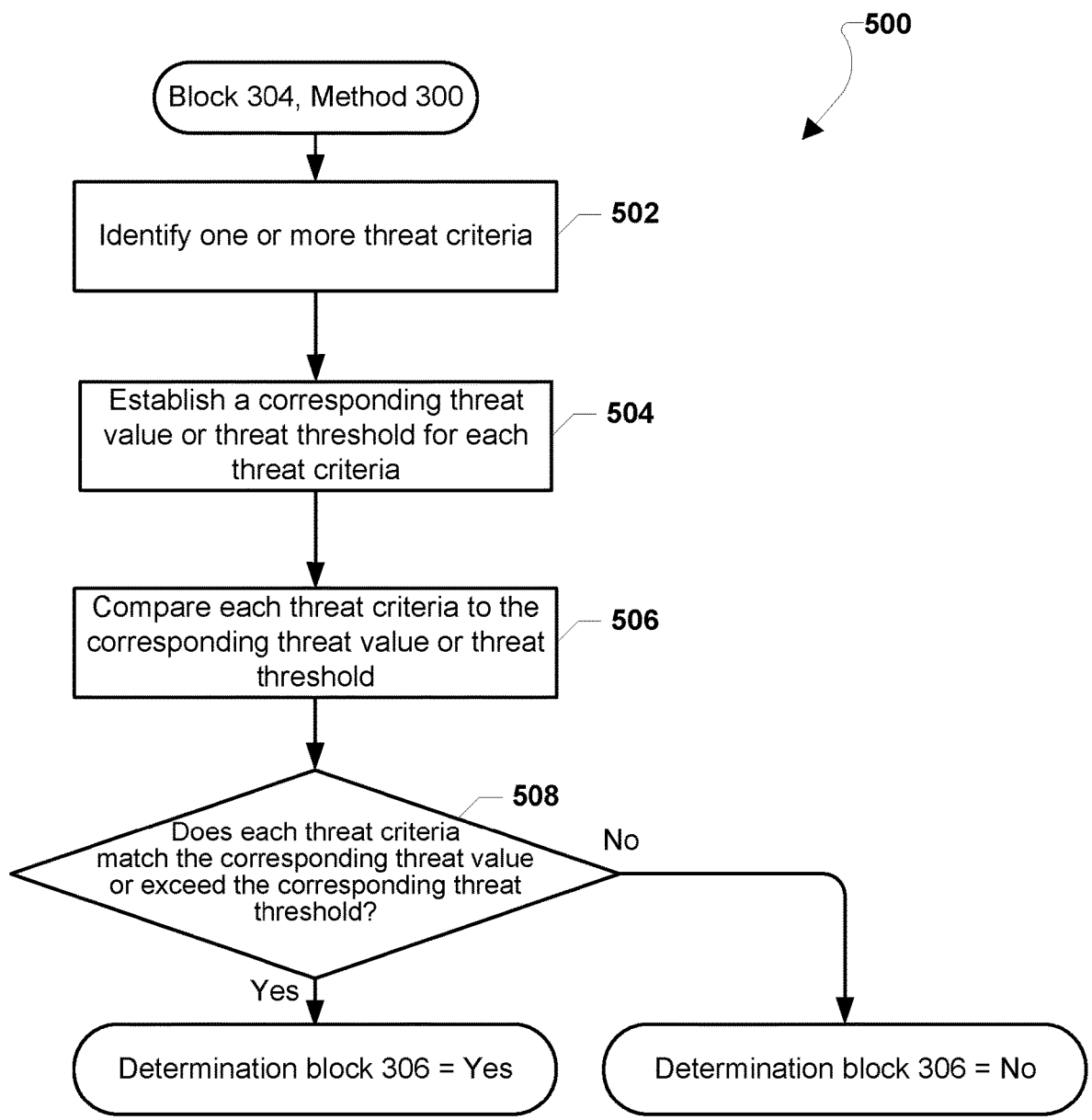
FIG. 5 is a process flow diagram illustrating a method for determining whether a detected object is a potential threat to the target entity according to various embodiments.

In determination block 306, the processor may determine whether an object is a potential threat to the target entity. Any of a variety of methods may be used for this determination. In some embodiments, the processor may determine whether an object is a potential threat by evaluating one or more threat criteria associated with the object and the target entity. In some embodiments, the processor may compare the one or more threat criteria to corresponding threat value(s) and/or threat threshold(s). Determining whether an object is a potential threat to the target entity is described in more detail with reference to method 500 (FIG. 5).

In response to determining that a detected object is not a potential threat to the target entity (i.e., determination block 306="No"), the processor may continue detecting objects in the presence of the target entity in block 304. Although block 304 and determination block 306 are depicted serially, this is only for simplicity. In some embodiments, the processor may continuously detect objects in the presence of the target entity without waiting for a determination of whether a previously detected object is a potential threat to the target entity. Similarly, the processor may continuously determine whether previously detected objects are a potential threat to the target entity without regard to whether additional objects are detected in the presence of the target entity.

Figure 6:
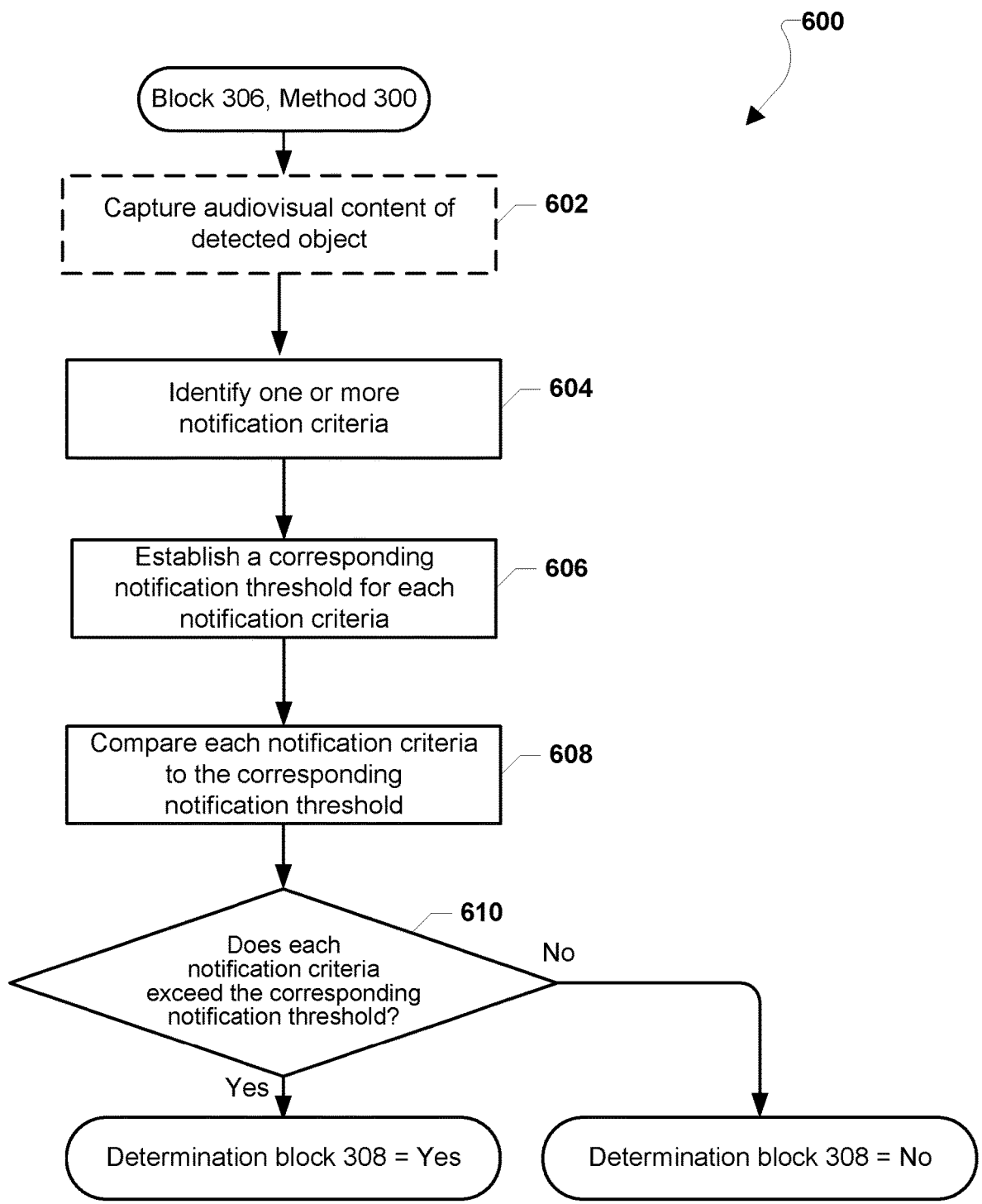
FIG. 6 is a process flow diagram illustrating a method for determining whether to notify a third party of the potential threat to the target entity according to various embodiments.

In response to determining that a detected object is a potential threat to the target entity (i.e., determination block 306="Yes"), the processor may determine whether a third party should be notified of the potential threat to the target entity in determination block 308. In some embodiments, the processor may evaluate one or more notification criteria to determine whether the third party should be notified. In some embodiments, the processor may compare the one or more notification criteria to a corresponding notification threshold. Determining whether a third party should be notified is described in more detail with reference to method 600 (FIG. 6).

In response to determining that a third party should not be notified of the potential threat to the target entity (i.e., determination block 308="No"), the processor may continue detecting objects in the presence of the target entity in block 304. Although determination block 308 is depicted as serially following determination block 306, this is only for simplicity. In some embodiments, the processor may continuously determine whether a third party should be notified of a potential threat to the target entity without regard to whether additional objects are detected in the presence of the target entity.

In response to determining that a third party should be notified of the potential threat to the target entity (i.e., determination block 308="Yes"), the processor may send a notification to the third party in block 310. In some embodiments, the notification may be sent to a device associated with the third party. In some embodiments, the notification may include at least a portion of audiovisual content captured by the robotic vehicle (e.g., one or more images, a portion of video, or a portion of audio).

In block 312, the processor may receive a response from the third party. In some embodiments and situations, the response may include a command.

In block 314, the processor may control the robotic vehicle to perform an action based on the command included in the response from the third party. In some embodiments, the action may include, but is not limited to, recording an image, video, or audio of the object and the target entity, emitting an alarm (e.g., a siren), emitting/flashing a light (e.g., a strobe light), navigating the drone to a position between the object and the target entity (i.e., attempting to block the threat from the target entity), moving the drone towards the object (e.g., attempting to "scare" the threat away), emitting an audio or video message, establishing a channel of communication with emergency personnel and/or the third party, and/or the like.

FIG. 4 illustrates a method 400 for detecting an object in the presence of a target entity. The method 400 may implement the operations represented by block 304 of the method 300 (FIG. 3). With reference to FIGS. 1-4, the operations of the method 400 may be performed by one or more processors (e.g., the processor 120) of a robotic vehicle (e.g., the robotic vehicle 100).

In block 402, the processor may identify one or more detection criteria. In some embodiments, the detection criteria may include, but is not limited to, a threshold distance between the object and the target entity, a length of time, a number of other objects, a location of the target entity, a location of the third party, and/or the like. In some embodiments, the one or more detection criteria may be identified based on input provided by the third party. For example, the third party may provide information describing objects of concern or otherwise indicating which objects should be detected and/or when such objects should be detected as being in the presence of the target entity. In other embodiments, the one or more detection criteria may be identified dynamically by the processor. For example, based on historical data and/or other information available to the processor, the processor may identify detection criteria and such detection criteria may change over time.

In block 404, the processor may establish a corresponding detection threshold for each of the one or more detection criteria. In some embodiments, each corresponding detection threshold may be established based on input provided by the third party. In other embodiments, each corresponding detection criteria may be established dynamically by the processor. In further embodiments, each corresponding detection threshold may be established based on input provided by the third party and dynamically by the processor.

In block 406, the processor may detect an object based on whether each of the one or more detection criteria exceeds the corresponding detection threshold. For example, if the distance between the object and the target entity is a detection criteria and the detection threshold distance is 5 feet, the processor may not detect objects outside of a 5-foot radius. However, the processor may detect objects within the 5-foot radius.

FIG. 5 illustrates a method 500 for determining whether a detected object is a potential threat for a target entity according to various embodiments. The method 500 may implement the operations represented by block 306 of the method 300 (FIG. 3). With reference to FIGS. 1-5, the operations of the method 500 may be performed by a processor (e.g., the processor 120) of a robotic vehicle (e.g., the robotic vehicle 100).

In block 502, the processor may identify one or more threat criteria. In some embodiments, the threat criteria may include, but is not limited to, existence of physical contact between the object and the target entity, a time spent proximate the target entity, a type of the object, an orientation of the object, an identity of the object, a change in distance between the object and the target entity, presence of a keyword or sound within captured audio, and/or the like. In some embodiments, the one or more threat criteria may be identified based on input provided by the third party. In some embodiments, the one or more threat criteria may be identified dynamically by the processor. For example, based on historical data and/or other information available to the processor, the processor may identify threat criteria and such threat criteria may change over time.

In block 504, the processor may establish a corresponding threat value or threat threshold for each of the one or more threat criteria. In some embodiments, each corresponding threat value or threat threshold may be established based on input provided by the third party. In some embodiments, each corresponding threat value or threat criteria may be established dynamically by the processor. In further embodiments, each corresponding threat value or threat threshold may be established based on input provided by the third party and dynamically by the processor.

In some embodiments, different threat criteria may be identified for different objects and the corresponding threat value or threat threshold established may differ based on a type or nature of the detected object being evaluated. For example, a distance threshold may be larger for an animal and smaller for a human (e.g., a dog may be allowed to get closer than a human) and a time threshold may be smaller for a fast-moving object while a time threshold may be larger for a slow(er)-moving object.

In block 506, each threat criteria for a detected object is compared to the corresponding threat value or threat threshold. In some embodiments, the processor may perform such a comparison. In some embodiments, information describing the object may be sent to a server and the server may perform the comparison.

In determination block 508, the processor may determine whether each threat criteria matches the corresponding threat value or exceeds the corresponding threat threshold. In some embodiments, all threat criteria must match the corresponding threat value or exceed the corresponding threat threshold in order for a detected object to be determined a potential threat. In other embodiments, only a portion of threat criteria must match or exceed the corresponding threat value or threat threshold.

In response to determining that each threat criterion does not match or exceed each corresponding threat value or threat threshold (i.e., determination block 508="No"), the processor may determine that the detected object is not a potential threat to the target entity in block 306 of the method 300 as described.

In response to determining that each threat criterion does match or exceed each corresponding threat value or threat threshold (i.e., determination block 508="Yes"), the processor may determine that the detected object is a potential threat to the target entity in block 306 of the method 300 as described.

FIG. 6 illustrates a method 600 for determining whether a third party should be notified of a potential threat to the target entity according to various embodiments. The method 600 may implement the operations represented by determination block 308 of method 300 (FIG. 3). With reference to FIGS. 1-6, the operations of the method 600 may be performed by a processor (e.g., the processor 120) of a robotic vehicle (e.g., the robotic vehicle 100).

In optional block 602, the processor may control the robotic vehicle to capture audiovisual content of a detected object. For example, the robotic vehicle may capture one or more images, video, and/or audio of the detected object and/or of an area surrounding the target entity. In some embodiments, at least a portion of the captured audiovisual content may be included in a notification sent to a third party.

In bock 604, the processor may identify one or more notification criteria. In some embodiments, the notification criteria may include, but is not limited to, a location of the target entity, a location of the third party, a time of day, a day of week, a nature of the potential threat, existence of a geo-fence, and/or the like. In some embodiments, the notification criteria may include a white list of people or objects that can approach the target entity (e.g., parents, family members, etc.) and/or a black list of people or objects that should not approach the target entity. In some embodiments, the one or more notification criteria may be identified based on input provided by the third party. In some embodiments, the one or more notification criteria may be identified dynamically by the processor. For example, based on historical data and/or other information available to the processor, the processor may identify notification criteria and such notification criteria may change over time. In some embodiments, certain threats may have automatic actions (e.g., do not wait for response from third party), such as if the detected object is on a black list. In some embodiments, the third party may mute notifications (all notifications or only certain types) for a period of time or until reenabled.

In block 606, the processor may establish a corresponding notification threshold for each of the one or more notification criteria. In some embodiments, each corresponding notification threshold may be established based on input provided by the third party. In other embodiments, each corresponding notification criteria may be established dynamically by the processor. In further embodiments, each corresponding notification threshold may be established based on input provided by the third party and dynamically by the processor.

In block 608, each notification criterion is compared to the corresponding notification threshold. In some embodiments, the processor may perform such comparison. In other embodiments, information describing the object may be sent to a server and the server may perform such comparison.

In determination block 610, the processor may determine whether each notification criterion exceeds the corresponding notification threshold. In some embodiments, all notification criteria must exceed the corresponding notification threshold in order for a notification to be sent to the third party. In some embodiments, only a portion of notification criteria must exceed the corresponding notification threshold.

In response to determining that each notification criterion does not exceed each notification threshold (i.e., determination block 610="No"), the processor may refrain from sending a notification to the third party in block 308 of the method 300.

In response to determining that each notification criterion exceeds each notification threshold (i.e., determination block 610="Yes"), the processor may send a notification to the third party in block 310 of the method 300.

Figure 7:
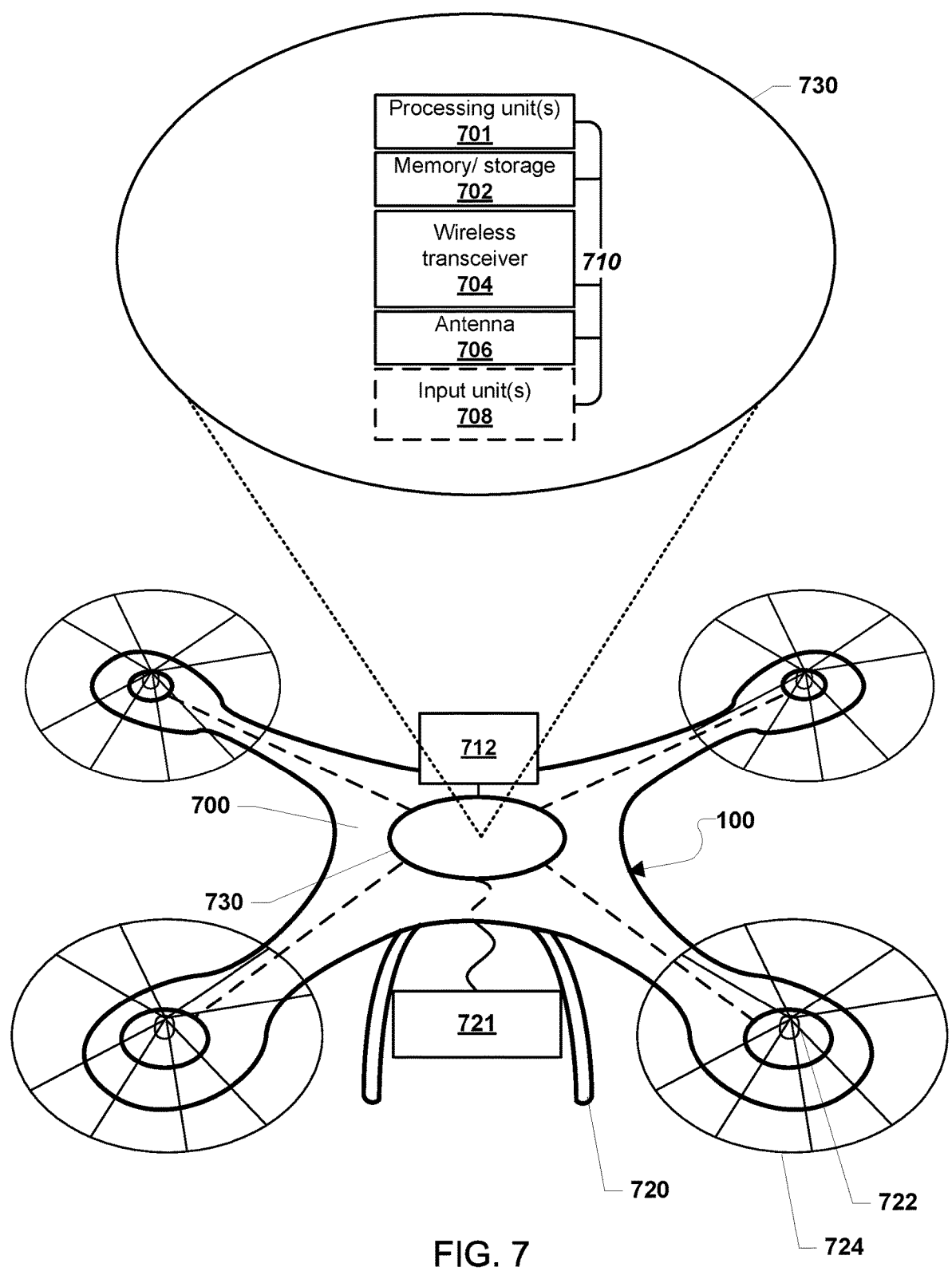
FIG. 7 is a component block diagram of an aerial robotic vehicle suitable for use with various embodiments.
Figure 8:
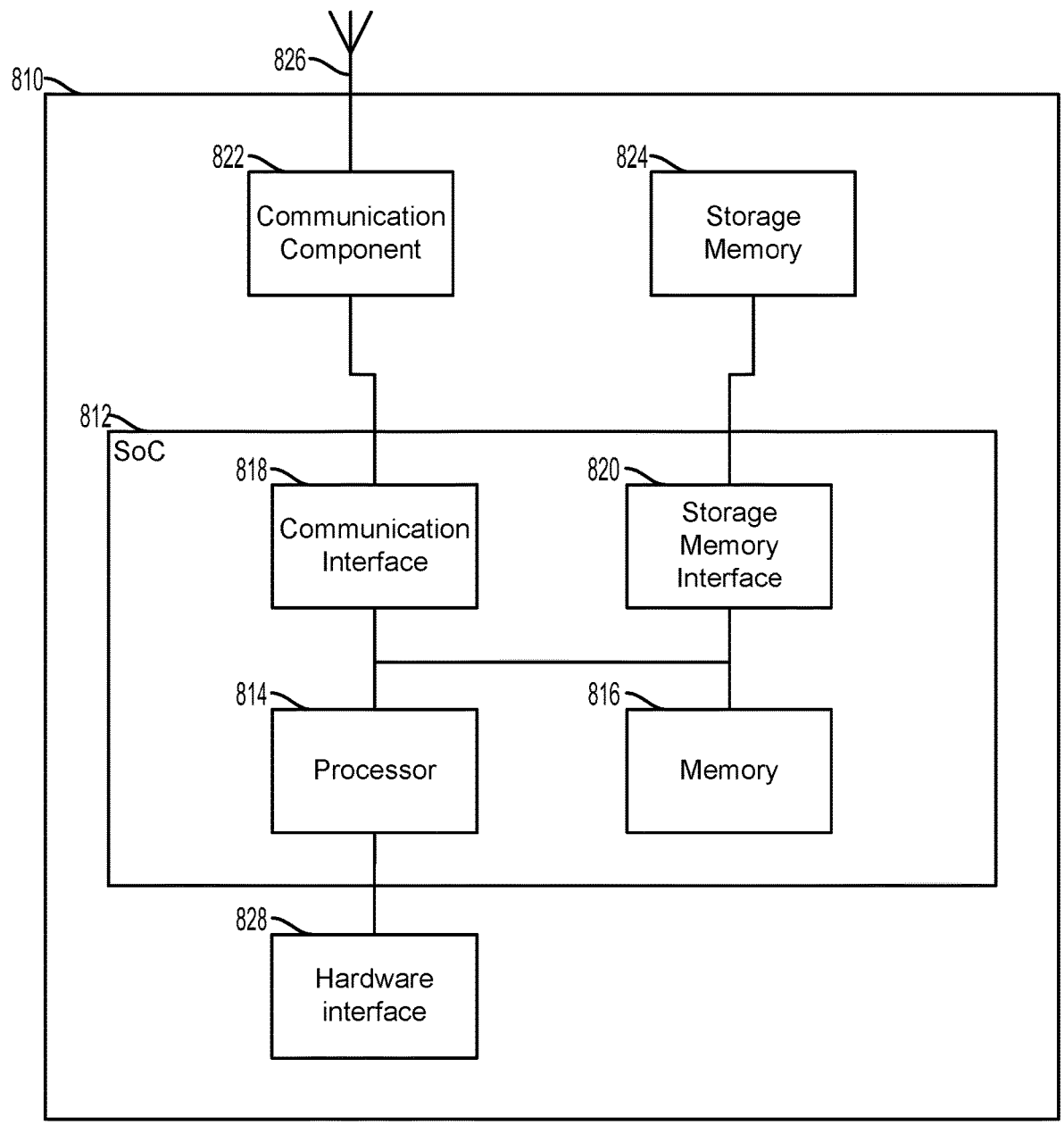
FIG. 8 is a component block diagram illustrating a processing device suitable for implementing various embodiments.

Various embodiments may be implemented within a variety of robotic vehicles, an example of which in the form of a four-rotor robotic vehicle is illustrated in FIG. 7 that is suitable for use with various embodiments. With reference to FIGS. 1-7, the robotic vehicle 100 may include a body 700 e.g., fuselage, frame, etc.) that may be made out of any combination of plastic, metal, or other materials suitable for flight. The body 700 may include a processor 730 that is configured to monitor and control the various functionalities, subsystems, and/or other components of the robotic vehicle 100. For example, the processor 730 may be configured to monitor and control various functionalities of the robotic vehicle 100, such as any combination of modules, software, instructions, circuitry, hardware, etc. related to propulsion, navigation, power management, sensor management, and/or stability management.

The processor 730 may include one or more processing unit(s) 701, such as one or more processors configured to execute processor-executable instructions (e.g., applications, routines, scripts, instruction sets, etc.), a memory and/or storage unit 702 configured to store data (e.g., flight plans, obtained sensor data, received messages, applications, etc.), and a wireless transceiver 704 and antenna 706 for transmitting and receiving wireless signals (e.g., a Wi-Fi® radio and antenna, Bluetooth®, RF, etc.). In some embodiments, the robotic vehicle 100 may also include components for communicating via various wide area networks, such as cellular network transceivers or chips and associated antenna (not shown). In some embodiments, the processor 730 of the robotic vehicle 100 may further include various input units 708 for receiving data from human operators and/or for collecting data indicating various conditions relevant to the robotic vehicle 100. For example, the input units 708 may include camera(s), microphone(s), location information functionalities (e.g., a global positioning system (GPS) receiver for receiving GPS coordinates), flight instruments (e.g., attitude indicator(s), gyroscope(s), accelerometer(s), altimeter(s), compass(es), etc.), keypad(s), etc. Various components of the processor 730 may be connected via a bus 710 or other similar circuitry.

The body 700 may include landing gear 720 of various designs and purposes, such as legs, skis, wheels, pontoons, etc. The body 700 may also include a payload mechanism 721 configured to hold, hook, grasp, envelope, and otherwise carry various payloads, such as boxes. In some embodiments, the payload mechanism 721 may include and/or be coupled to actuators, tracks, rails, ballasts, motors, and other components for adjusting the position and/or orientation of the payloads being carried by the robotic vehicle 100. For example, the payload mechanism 721 may include a box moveably attached to a rail such that payloads within the box may be moved back and forth along the rail. The payload mechanism 721 may be coupled to the processor 730 and thus may be configured to receive configuration or adjustment instructions. For example, the payload mechanism 721 may be configured to engage a motor to re-position a payload based on instructions received from the processor 730.

The robotic vehicle 100 may be of a helicopter design that utilizes one or more rotors 724 driven by corresponding motors 722 to provide lift-off (or take-off) as well as other aerial movements (e.g., forward progression, ascension, descending, lateral movements, tilting, rotating, etc.). The robotic vehicle 100 may utilize various motors 722 and corresponding rotors 724 for lifting off and providing aerial propulsion. For example, the robotic vehicle 100 may be a "quad-copter" that is equipped with four motors 722 and corresponding rotors 724. The motors 722 may be coupled to the processor 730 and thus may be configured to receive operating instructions or signals from the processor 730. For example, the motors 722 may be configured to increase rotation speed of their corresponding rotors 724, etc. based on instructions received from the processor 730. In some embodiments, the motors 722 may be independently controlled by the processor 730 such that some rotors 724 may be engaged at different speeds, using different amounts of power, and/or providing different levels of output for moving the robotic vehicle 100. For example, motors 722 on one side of the body 700 may be configured to cause their corresponding rotors 724 to spin at higher rotations per minute (RPM) than rotors 724 on the opposite side of the body 700 in order to balance the robotic vehicle 100 burdened with an off-centered payload.

The body 700 may include a power source 712 that may be coupled to and configured to power the various other components of the robotic vehicle 100. For example, the power source 712 may be a rechargeable battery for providing power to operate the motors 722, the payload mechanism 721, and/or the units of the processor 730.

Various embodiments may be implemented within a processing device 810 configured to be used in a robotic vehicle. A processing device may be configured as or including a system-on-chip (SOC) 812, an example of which is illustrated FIG. 8. With reference to FIGS. 1-8, the SOC 812 may include (but is not limited to) a processor 814, a memory 816, a communication interface 818, and a storage memory interface 820. The processing device 810 or the SOC 812 may further include a communication component 822, such as a wired or wireless modem, a storage memory 824, an antenna 826 for establishing a wireless communication link, and/or the like. The processing device 810 or the SOC 812 may further include a hardware interface 828 configured to enable the processor 814 to communicate with and control various components of a robotic vehicle. The processor 814 may include any of a variety of processing devices, for example any number of processor cores.

The term "system-on-chip" (SOC) is used herein to refer to a set of interconnected electronic circuits typically, but not exclusively, including one or more processors (e.g., 814), a memory (e.g., 816), and a communication interface (e.g., 818). The SOC 812 may include a variety of different types of processors 814 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SOC 812 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SOC 812 may include one or more processors 814. The processing device 810 may include more than one SOC 812, thereby increasing the number of processors 814 and processor cores. The processing device 810 may also include processors 814 that are not associated with an SOC 812 (i.e., external to the SOC 812). Individual processors 814 may be multicore processors. The processors 814 may each be configured for specific purposes that may be the same as or different from other processors 814 of the processing device 810 or SOC 812. One or more of the processors 814 and processor cores of the same or different configurations may be grouped together. A group of processors 814 or processor cores may be referred to as a multi-processor cluster.

The memory 816 of the SOC 812 may be a volatile or non-volatile memory configured for storing data and processor-executable instructions for access by the processor 814. The processing device 810 and/or SOC 812 may include one or more memories 816 configured for various purposes. One or more memories 816 may include volatile memories such as random access memory (RAM) or main memory, or cache memory.

Some or all of the components of the processing device 810 and the SOC 812 may be arranged differently and/or combined while still serving the functions of the various aspects. The processing device 810 and the SOC 812 may not be limited to one of each of the components, and multiple instances of each component may be included in various configurations of the processing device 810.

Various processors described herein may be any programmable microprocessor, microcomputer or multiple processor chip or chips that can be configured by software instructions (applications) to perform a variety of functions, including the functions of various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read only memory (ROM), electrically erasable programmable ROM (EEPROM), FLASH memory, compact disc ROM (CD-ROM) or other optical disk storage, magnetic disk storage or other magnetic storage smart objects, or any other medium that may be used to store desired program code in the form of instructions or data structures and that may be accessed by a computer. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of memory described herein are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method for monitoring a target entity by a drone, the method comprising:
   tracking the target entity by the drone;
   detecting, by the drone, an object in the presence of the target entity based on one or more detection criteria and one or more detection thresholds;
   determining, by the drone based on one or more threat criteria and one or more threat thresholds different from the one or more detection thresholds, whether the object is a potential threat to the target entity;
   identifying, by the drone, one or more notification criteria based on one of an input provided by a third party or dynamically;
   establishing, by the drone, each corresponding notification threshold for each of the one or more notification criteria;
   determining, by the drone, whether to notify the third party of the potential threat to the target entity based on the one or more notification criteria and the one or more notification thresholds in response to determining that the object is a potential threat, wherein the third party has a pre-existing relationship with the target entity, and wherein the one or more notification thresholds are different from the one or more detection thresholds and the one or more threat thresholds;
   notifying, by the drone, the third party of the potential threat to the target entity in response to determining that the third party should be notified;
   receiving a response from the third party including a command; and
   performing, by the drone, an action based on the command.

2. The method of claim 1, wherein the one or more notification criteria include at least one of:
   a location of the target entity;
   a location of the third party;
   a distance between the target entity and the third party;
   a presence of obstacles between the target entity and the third party;
   a time of day;
   a day of week;
   a nature of the potential threat; or
   an existence of a geo-fence.

3. The method of claim 2, wherein notifying the third party of the potential threat to the target entity comprises sending, by the drone, a notification message to a device associated with the third party in response to determining that each of the one or more notification criteria is met.

4. The method of claim 1, further comprising capturing, by the drone, audiovisual content of the detected object, wherein notifying the third party of the potential threat to the target entity in response to determining that the third party should be notified comprises sending a notification message to a device associated with the third party, the notification message comprising at least a portion of the captured audiovisual content.

5. The method of claim 1, wherein the one or more detection criteria include at least one of:
   a distance between the object and the target entity;
   a length of time;
   a number of other objects;
   a location of the target entity; or
   a location of the third party.

6. The method of claim 5, wherein detecting the object in the presence of the target entity comprises determining whether each of the one or more detection criteria exceeds a corresponding detection threshold of the one or more detection thresholds.

7. The method of claim 5, further comprising:
   identifying the one or more detection criteria based on input provided by the third party; and
   establishing each corresponding detection threshold of the one or more detection thresholds based on input provided by the third party.

8. The method of claim 5, further comprising:
   identifying, by the drone, the one or more detection criteria dynamically; and
   establishing, by the drone, each corresponding detection threshold of the one or more detection thresholds dynamically.

9. The method of claim 1, wherein the one or more threat criteria include at least one of:
   a distance between the object and the target entity;
   existence of physical contact between the object and the target entity;
   a type of the object;
   a size of the object;
   a speed of the object;
   an orientation of the object;
   an identity of the object;
   a change in distance between the object and the target entity;
   a rate of change in distance;
   a gesture performed by the object or the target entity; or
   recognition of a key word or sound spoken within captured audio.

10. The method of claim 9, wherein determining whether the object is a potential threat to the target entity comprises determining whether each of the one or more threat criteria matches a corresponding predetermined threat value or exceeds a corresponding threat threshold of the one or more threat thresholds.

11. The method of claim 9, further comprising:
    identifying the one or more threat criteria based on input provided by the third party; and
    establishing each corresponding predetermined threat value or threat threshold of the one or more threat thresholds based on input provided by the third party.

12. The method of claim 9, further comprising:
    identifying, by the drone, the one or more detection criteria dynamically; and
    establishing, by the drone, each corresponding predetermined threat value or threat threshold of the one or more threat thresholds dynamically.

13. The method of claim 1, wherein performing the action includes performing one or more of:
    recording an image, video, or audio of the object and the target entity;
    emitting an alarm;
    emitting/flashing a light;
    navigating the drone to a position between the object and the target entity;
    moving the drone towards the object;
    emitting an audio or video message; or
    establishing a channel of communication with at least one of emergency personnel and the third party.

14. The method of claim 1, wherein determining whether to notify the third party of the potential threat to the target entity comprises:
    evaluating the one or more notification criteria by comparing the one or more notification criteria with a corresponding notification threshold of the one or more notification thresholds.

15. The method of claim 1, further comprising refraining from notifying the third party of the potential threat to the target entity in response to determining that the third party should not be notified, wherein determining that the third party should not be notified is based on determining that each of the one or more notification criteria does not exceed a corresponding notification threshold of the one or more notification thresholds.

16. The method of claim 1, further comprising:
    identifying, by the drone, the one or more threat criteria based on a type of object detected by the drone; and
    establishing, by the drone, a corresponding threat value or threat threshold for each of the one or more threat criteria based on the type of object detected by the drone.

17. The method of claim 1, further comprising:
    identifying, by the drone, the one or more detection criteria dynamically based at least on environment around the target entity; and
    establishing, by the drone, each corresponding detection threshold dynamically for each of the one or more detection criteria.

18. A robotic vehicle, comprising:
    a processor configured with processor-executable instructions to:
    track a target entity;
    detect an object in the presence of the target entity based on one or more detection criteria and one or more detection thresholds;
    determine whether the object is a potential threat to the target entity based on one or more threat criteria and one or more threat thresholds different from the one or more detection thresholds;
    identify one or more notification criteria based on one of an input provided by a third party or dynamically;
    establish each corresponding notification threshold for each of the one or more notification criteria;
    determine whether to notify the third party of the potential threat to the target entity based on the one or more notification criteria and the one or more notification thresholds in response to determining that the object is a potential threat, wherein the third party has a pre-existing relationship with the target entity, and wherein the one or more notification thresholds are different from the one or more detection thresholds and the one or more threat thresholds;
    notify the third party of the potential threat to the target entity in response to determining that the third party should be notified;
    receive a response from the third party including a command; and
    perform an action based on the command.

19. The robotic vehicle of claim 18, wherein:
    the one or more notification criteria include at least one of:

a location of the target entity;
a location of the third party;
a distance between the target entity and the third party;
a presence of obstacles between the target entity and the third party;
a time of day;
a day of week;
a nature of the potential threat; or
an existence of a geo-fence; and
the processor is further configured with processor-executable instructions to notify the third party of the potential threat to the target entity by sending a notification message to a device associated with the third party in response to determining that each of the one or more notification criteria is met.

20. The robotic vehicle of claim 18, wherein:
the one or more detection criteria include at least one of:
a distance between the object and the target entity;
a length of time;
a number of other objects;
a location of the target entity; or
a location of the third party; and
the processor is further configured with processor-executable instructions to detect the object in the presence of the target entity by determining whether each of the one or more detection criteria exceeds a corresponding detection threshold of the one or more detection thresholds.

21. The robotic vehicle of claim 20, wherein the processor is further configured with processor-executable instructions to:
identify the one or more detection criteria based on input provided by the third party; and
establish each corresponding detection threshold of the one or more detection thresholds based on input provided by the third party.

22. The robotic vehicle of claim 18, wherein:
the one or more threat criteria include at least one of:
a distance between the object and the target entity;
existence of physical contact between the object and the target entity;
a type of the object;
a size of the object;
a speed of the object;
an orientation of the object;
an identity of the object;
a change in distance between the object and the target entity;
a rate of change in distance;
a gesture performed by the object or the target entity; or
recognition of a key word or sound spoken within captured audio; and
the processor is further configured with processor-executable instructions to determine whether the object is a potential threat to the target entity by determining whether each of the one or more threat criteria matches a corresponding predetermined threat value or exceeds a corresponding threat threshold of the one or more threat thresholds.

23. The robotic vehicle of claim 18, wherein the processor is further configured with processor-executable instructions to perform the action by performing one or more of:
recording an image, video, or audio of the object and the target entity;
emitting an alarm;
emitting/flashing a light;
navigating the robotic vehicle to a position between the object and the target entity;
moving the robotic vehicle towards the object;
emitting an audio or video message; or
establishing a channel of communication with at least one of emergency personnel and the third party.

24. A robotic vehicle, comprising:
means for tracking a target entity;
means for detecting an object in the presence of the target entity based on one or more detection criteria and one or more detection thresholds;
means for determining whether the object is a potential threat to the target entity based on one or more threat criteria and one or more threat thresholds different from the one or more detection thresholds;
means for identifying one or more notification criteria based on one of an input provided by a third party or dynamically;
means for establishing each corresponding notification threshold for each of the one or more notification criteria;
means for determining whether to notify the third party of the potential threat to the target entity based on the one or more notification criteria and the one or more notification thresholds in response to determining that the object is a potential threat, wherein the third party has a pre-existing relationship with the target entity, and wherein the one or more notification thresholds are different from the one or more detection thresholds and the one or more threat thresholds;
means for notifying the third party of the potential threat to the target entity in response to determining that the third party should be notified;
means for receiving a response from the third party including a command; and
means for performing an action based on the command.

25. A processor configured with processor-executable instructions to:
track a target entity;
detect an object in the presence of the target entity based on one or more detection criteria and one or more detection thresholds;
determine whether the object is a potential threat to the target entity based on one or more threat criteria and one or more threat thresholds different from the one or more detection thresholds;
identify one or more notification criteria based on one of an input provided by a third party or dynamically;
establish each corresponding notification threshold for each of the one or more notification criteria;
determine whether to notify the third party of the potential threat to the target entity based on the one or more notification criteria and the one or more notification thresholds in response to determining that the object is a potential threat, wherein the third party has a pre-existing relationship with the target entity, and wherein the one or more notification thresholds are different from the one or more detection thresholds and the one or more threat thresholds;
notify the third party of the potential threat to the target entity in response to determining that the third party should be notified;
receive a response from the third party including a command; and
perform an action based on the command.

26. The processor of claim 25, wherein:
the one or more notification criteria include at least one of:

a location of the target entity;
a location of the third party;
a distance between the target entity and the third party;
a presence of obstacles between the target entity and the third party;
a time of day;
a day of week;
a nature of the potential threat; or
an existence of a geo-fence; and the processor is further configured with processor-executable instructions to notify the third party of the potential threat to the target entity by sending a notification message to a device associated with the third party in response to determining that each of the one or more notification criteria is met.

27. The processor of claim 26, wherein:
the processor is further configured with processor-executable instructions to capture audiovisual content of the detected object; and
the notification message comprises at least a portion of the captured audiovisual content.

28. The processor of claim 25, wherein:
the one or more detection criteria include at least one of:
a distance between the object and the target entity;
a length of time;
a number of other objects;
a location of the target entity; or
a location of the third party; and
the processor is further configured with processor-executable instructions to detect the object in the presence of the target entity by determining whether each of the one or more detection criteria exceeds a corresponding detection threshold of the one or more detection thresholds.

29. The processor of claim 25, wherein:
the one or more threat criteria include at least one of:
a distance between the object and the target entity;
existence of physical contact between the object and the target entity;
a type of the object;
a size of the object;
a speed of the object;
an orientation of the object;
an identity of the object;
a change in distance between the object and the target entity;
a rate of change in distance;
a gesture performed by the object or the target entity; or
recognition of a key word or sound spoken within captured audio; and the processor is further configured with processor-executable instructions to determine whether the object is a potential threat to the target entity by determining whether each of the one or more threat criteria matches a corresponding predetermined threat value or exceeds a corresponding threat threshold of the one or more threat thresholds.

30. The processor of claim 25, further configured with processor-executable instructions to perform the action by performing one or more of:
recording an image, video, or audio of the object and the target entity;
emitting an alarm;
emitting/flashing a light;
navigating a robotic vehicle to a position between the object and the target entity;
moving the robotic vehicle towards the object;
emitting an audio or video message; or
establishing a channel of communication with at least one of emergency personnel and the third party.

* * * * *